UNITED STATES PATENT OFFICE.

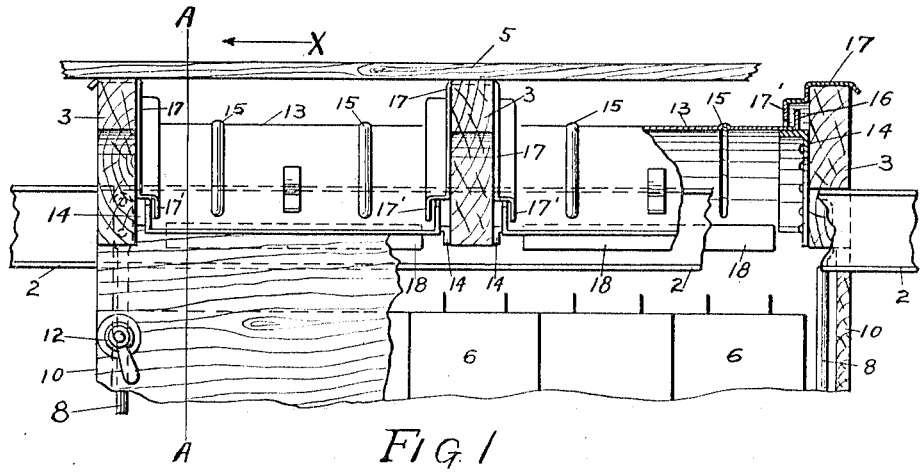
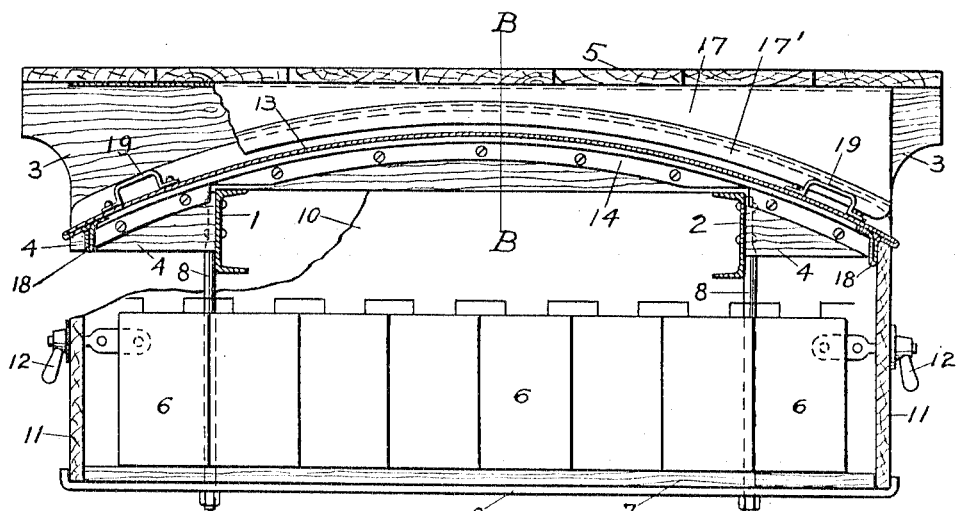
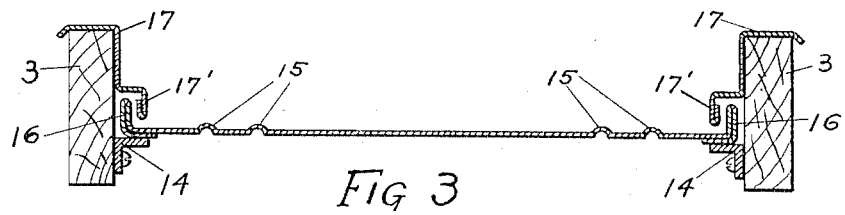

WILLIAM G. MERKLE, OF NEWARK, NEW JERSEY.

REMOVABLE COVER FOR BATTERY-COMPARTMENTS.

1,116,313.  Specification of Letters Patent.  Patented Nov. 3, 1914.

Application filed September 9, 1913. Serial No. 788,851.

*To all whom it may concern:*

Be it known that I, WILLIAM G. MERKLE, a citizen of the United States, residing at Newark, in the county of Essex and State of New Jersey, have invented certain new and useful Improvements in Removable Covers for Battery-Compartments; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in removable watershedding covers for battery compartments or boxes of auto-vehicles; and the invention relates, more particularly, to a novel construction of sliding cover for battery compartments or boxes adapted to protect the batteries contained therein from rain, hail, snow or other foreign matters which are apt to be spilled from the vehicle body or platform into the battery compartment or boxes, whereby short-circuits and other detrimental battery conditions are liable to be engendered.

The invention has for its principal object to provide a removable watershedding and dirtshedding cover-member for battery compartments or boxes, the same being of a strong and durable yet simple construction, having protected guide and supporting means, and the same being arranged and constructed to be easily locked and maintained in its closed or covering position, whereby the interior of the battery compartment or box, and the batteries contained therein, are properly protected from moisture and other foreign matters which might prove detrimental to proper operative battery conditions.

Other objects of this invention not at this time more particularly enumerated will be clearly understood from the following detailed description of the present invention.

With the various objects of the present invention in view, the said invention consists, primarily, in the novel removable cover for battery compartments or boxes hereinafter set forth; and, the invention consists, furthermore, in the novel arrangements and combinations of the several devices and parts, as well as in the details of the construction of the same, all of which will be more fully described in detail in the following specification, and then embodied in the clauses of the claim which are appended to and which form an essential part of the said specification.

The invention is clearly illustrated in the accompanying drawings, in which:—

Figure 1 is a part side elevation and part section of a battery compartment or box connected with the chassis and cross-beams or sleepers of an auto-vehicle, and equipped with my novel arrangement and construction of removable cover-members. Fig. 2 is a detail cross section of the same taken on line A—A in said Fig. 1 looking in the direction of the arrow X. Fig. 3 is a detail longitudinal cross section of a cover-member and its supporting guides as arranged and supported between a pair of cross-beams or sleepers of the chassis or under structure of the auto-vehicle.

Similar characters of reference are employed in all of the above-described views to indicate corresponding parts.

Referring now to the said drawings, the reference characters 1 and 2 indicates the longitudinal channel-beams of the chassis of an auto-vehicle, upon which are mounted, at suitable intervals, the laterally extending cross-beams or sleepers 3, the same being provided at each end with downwardly extending shoulders or butts 4 adapted to be bolted, or otherwise secured, to said channel-beams 1 and 2, to maintain the same in their properly located positions. Supported by said cross-beams or sleepers 3 is the platform 5 of the vehicle body. The electric batteries 6 are carried upon a supporting-platform 7 which is suspended from the chassis by means of hanger-rods 8 and transversely extending bracket-members 9. Said hanger-rods 8 are secured at their upper ends, by any suitable fastening means, to said channel-beams 1 and 2, the lower ends of said hanger-rods extending through said bracket-members 9, the latter being properly maintained in secured relation to said hanger-rods by nuts or other suitable holding means, the said supporting-platform 7 then extending over said bracket-members 9 so as to be supported thereby. The battery compartment or box, of which said supporting-platform provides the bottom member, is completed by the end walls 10 and the removable side panels or walls 11, the latter being secured in their assembled or normal positions by means of locking elements or fastening devices 12.

Heretofore the battery compartment thus formed has been incomplete since no method of closing over the top of the same has been devised. It therefore happened that the tops of the batteries were left exposed, except for such protection as the platform 5 of the vehicle body might provide, consequently rain-water, snow, dirt, etc., would be thrown from the vehicle wheels into the battery compartment, or water or other liquids would leak through the platform 5 upon the batteries, or dirt, moisture, etc., would otherwise find its way into the battery compartment, the resulting effect of these occurrences being detrimental to the batteries, often causing short circuits and other battery troubles. In my present invention I have solved the problem of providing a cover for this battery compartment, which possesses the necessary characteristics of being easily removable, of being water and dirt proof, and being so arranged as to shed any moisture accumulating upon the same, and at the same time I have provided an easy and secure method of holding or locking said cover in its closed relation to the battery compartment.

Again referring to the drawings, the reference character 13 indicates the novel cover-member made according to and embodying the principles of my present invention. I prefer to construct my cover-member of some rust-resisting sheet-metal, although I do not wish to limit myself to the use of such material, since it is desired that the scope of my invention should include the use of any material adapted for the purpose. Secured, in any suitable manner, to oppositely facing sides of the sleepers or cross-beams 3 are angle-irons 14 which provide suitable guide-ways upon which said cover-member 13 is slidably supported. I prefer to shape the cover-member 13, and also the guide-members 14 in conformation therewith, to an even curvature, as shown, so that it will easily shed, to either one end or the other, any water or other liquid or foreign matter, although, if desired, the cover-member and guide-ways may be made flat and mounted to slant, to a greater or lesser degree, from one end to the other. In order to provide a requisite degree of rigidity to said cover-member 13 I provide the same with a plurality of strengthening or stiffening ribs 15, the same being pressed out of the body of said cover-member.

The sides of the cover-member 13 are provided with upwardly turned marginal flanges 16, which serve to prevent water or other foreign matter from falling over the sides of the cover-member and thus find a way into the battery compartment, and which further serve as additional guiding means for the cover-member, as well as to further stiffen and strengthen the same. Said marginal flanges 16 may themselves be strengthened or stiffened by doubling back the same upon themselves as shown in the drawings.

The reference character 17 indicates a flashing which is inserted between the platform 5 of the vehicle body and the sleepers or cross-beams 3 and then bent down across the oppositely facing sides of said sleepers or cross-beams, and then bent outwardly and downwardly to provide a capping 17' which extends over the marginal edges of said cover-member 13 and its marginal flanges 16, and the apron of which projects downwardly inside of the marginal flanges 16 toward said cover-member. The said capping thus formed is curved to conform to the curvature or slant of said cover-member, and the same protects the space between the side edges of the cover-member and the sleepers or cross-beams against the entrance of moisture or foreign matter therethrough, and at the same time said capping affords an additional guide means in coöperation with said marginal flanges 16 for the sliding movement of said cover-member 13. Secured to the under side of said cover member 13, adjacent to each end thereof, is a laterally extending end-flange or rib 18, the same being off-set so as to be positioned slightly in the rear of each edge of said cover-member 13. When the cover-member is slid home in its closing relation to said battery compartment, the said side panels or walls 11 are closed against said end-flanges or ribs 18 and so secured by the locking elements 12, thus securely maintaining said cover-member in its closing relation to said battery compartment against accidental opening or removal. When it is desired to remove said cover-member from its closing relation to said battery compartment, either one or the other of said side panels or walls 11 is removed, and by then grasping one of the handles 19, with which the top of said cover-member is provided, the cover-member can be moved slidingly upon said guide-ways 14 so as to be withdrawn.

It will be apparent from the above description that my present invention provides a very complete, strong and easily operated cover-member for battery compartments, which can be securely locked in place, and which can also be easily withdrawn or removed when it is so desired. It will also be clearly evident that the said cover-member is adapted to readily shed water, dirt, etc., and prevent access of the same to the battery compartment to the detriment of the batteries contained therein.

I am fully aware that some changes may be made in the general arrangements and combinations of the several devices and parts without departing from the scope of the present invention as set forth in the foregoing specification, and as defined in the clauses of the claim which are appended thereto. Hence, I do not limit my present invention to the exact arrangements and combinations of the several devices and parts as described in the said specification, nor do I confine myself to the exact details of the construction of the said parts, as illustrated in the accompanying drawings.

I claim:—

1. The combination with the chassis and cross-beams of an auto-vehicle body of a suspended platform, end-walls, and side panels providing a battery compartment, a removable cover-member adapted to close over said battery compartment, means connected with said cross-beams for slidably supporting said removable cover-member, upwardly turned marginal flanges connected with the side edges of said cover-member, and a flashing and capping connected with said cross-beams so as to over-lap the marginal flanges of said cover-member.

2. The combination with the chassis and cross-beams of an auto-vehicle body of a suspended platform, end walls, and side panels providing a battery compartment, a removable cover-member adapted to close over said battery compartment, means connected with said cross-beams for slidably supporting said removable cover-member, upwardly turned marginal flanges connected with the side edges of said cover-member, a flashing and capping connected with said cross-beams so as to over-lap the marginal flanges of said cover-member, and means connected with the ends of said cover-member adapted to engage said side panels of said battery compartment so as to maintain said cover-member in its closed relation to said battery compartment.

3. The combination with the chassis and cross-beams of an auto-vehicle body of a battery compartment comprising a supporting platform, means for suspending said supporting platform from said chassis, end walls, and removable side panels, a removable cover-member, guide-ways secured to said cross-beams for slidably supporting said cover-member so that the same closes over said battery compartment, and means for protecting the space between the side edges of said cover-member and said cross-beams against the passage of liquids or foreign matter therethrough.

4. The combination with the chassis and cross-beams of an auto-vehicle body of a battery compartment comprising a supporting platform, means for suspending said supporting platform from said chassis, end walls, and removable side panels, a removable cover-member, guide-ways secured to said cross-beams for slidably supporting said cover-member so that the same closes over said battery compartment, means for protecting the space between the side edges of said cover-member and said cross-beams against the passage of liquids or foreign matter therethrough, and means for securing said cover-member in closing relation to said battery compartment.

5. The combination with the chassis and cross-beams of an auto-vehicle body of a battery compartment comprising a supporting platform, means for suspending said supporting platform from said chassis, end walls, and removable side panels, a removable cover-member, guide-ways secured to said cross-beams for slidably supporting said cover-member so that the same closes over said battery compartment, upwardly turned marginal flanges connected with the side edges of said cover-member, and a flashing and capping connected with said cross-beams so as to over-lap said marginal flanges of said cover-member.

6. The combination with the chassis and cross-beams of an auto-vehicle body of a battery compartment comprising a supporting platform, means for suspending said supporting platform from said chassis, end walls, and removable side panels, a removable cover-member, guide-ways secured to said cross-beams for slidably supporting said cover-member so that the same closes over said battery compartment, upwardly turned marginal flanges connected with the side edges of said cover-member, a plurality of stiffening ribs formed in said cover-member, a flashing and capping connected with said cross-beams so as to over-lap said marginal flanges of said cover-member, end-flanges connected with the ends of said cover-member against which said side panels are closed so as to maintain said cover-member in its closing position, and means for securing said side panels in their closed relation to said battery compartment.

7. The combination with the chassis and cross-beams of an auto-vehicle body of a battery compartment comprising a supporting platform, means for suspending said supporting platform from said chassis, end walls, and removable side panels, a removable cover-member, guide-ways secured to said cross-beams for slidably supporting said cover-member so that the same closes over said battery compartment, upwardly turned marginal flanges connected with the side edges of said cover-member, a plurality of stiffening ribs formed in said cover-member, a flashing and capping connected with said cross-beams so as to over-lap said marginal flanges of said cover-member, end-flanges connected with the ends of said cover-member against which said side panels are closed so as to maintain said cover-member in its closing position, means for securing said side-panels in their closed relation to said battery compartment, and said cover-member, guide-ways, and flashing and capping being mounted at an inclination from a horizontal plane.

8. The combination with the chassis and cross-beams of an auto-vehicle body of a battery compartment comprising a supporting platform, means for suspending said supporting platform from said chassis, end walls, and removable side panels, a removable cover-member, guide-ways secured to said cross-beams for slidably supporting said cover-member so that the same closes over said battery compartment, upwardly turned marginal flanges connected with the side edges of said cover-member, a flashing and capping connected with said cross-beams so as to over-lap said marginal flanges of said cover-member, and means connected with the ends of said cover-member adapted to engage said side panels of said battery compartment so as to maintain said cover-member in its closed relation to said battery compartment.

In testimony, that I claim the invention set forth above I have hereunto set my hand this 6th day of September, 1913.

WILLIAM G. MERKLE.

Witnesses:
GEORGE D. RICHARDS,
FRED'K H. W. FRAENTZEL.